United States Patent [19]
Flick

[11] Patent Number: 6,130,605
[45] Date of Patent: *Oct. 10, 2000

[54] VEHICLE SECURITY SYSTEM WITH MULTI-SOUND PATTERN ALARM AND ASSOCIATED METHODS

[76] Inventor: Kenneth E. Flick, 5236 Presley Pl., Douglasville, Ga. 30135

[ * ] Notice: This patent issued on a continued prosecution application filed under 37 CFR 1.53(d), and is subject to the twenty year patent term provisions of 35 U.S.C. 154(a)(2).

[21] Appl. No.: 09/374,178

[22] Filed: Aug. 13, 1999

[51] Int. Cl.$^7$ ................................................ B60R 25/10
[52] U.S. Cl. .................. 340/426; 340/384.1; 340/384.3; 340/384.5; 340/328; 340/329
[58] Field of Search ................................. 340/426, 384.1, 340/384.3, 384.5, 384.7, 384.72, 328, 329; 381/17, 61, 63

[56] References Cited

U.S. PATENT DOCUMENTS

| | | | |
|---|---|---|---|
| 4,280,123 | 7/1981 | Right et al. | 340/384 E |
| 4,887,064 | 12/1989 | Drori et al. | 340/426 |
| 4,980,837 | 12/1990 | Nunn et al. | 364/484 |
| 5,012,221 | 4/1991 | Neuhaus et al. | 340/384 |
| 5,079,538 | 1/1992 | Defino et al. | 340/426 |
| 5,111,530 | 5/1992 | Kutaragi et al. | 395/20 |
| 5,896,291 | 4/1999 | Hewitt et al. | 381/61 |
| 5,923,256 | 7/1999 | Satake et al. | 340/575 |

*Primary Examiner*—Jeffery A. Hofsass
*Assistant Examiner*—Hung Nguyen
*Attorney, Agent, or Firm*—Allen, Dyer, Doppelt, Milbrath & Gilchrist, P.A.

[57] ABSTRACT

A vehicle security system includes an audible alarm indicator, and a controller to generate an alarm indication comprising a plurality of distinguishable sound patterns. The sound patterns overlap in time yet are audibly distinguishable from one another to thereby create an illusion of multiple alarms. Accordingly, a would-be thief may be convinced that multiple vehicle alarms have been triggered and, thus, that more than one vehicle owner may be alerted. The vehicle security system may include at least one vehicle security sensor, and the controller is preferably responsive to the sensor to generate the audible alarm indication. The distinguishable sound patterns may be different from one another. In some other embodiments, at least two of the distinguishable sound patterns are the same sound patterns, but which are out of phase with one another to provide the illusion of multiple alarms. Each of the distinguishable sound patterns preferably includes successive repetitive portions. For example, each of the distinguishable sound patterns may include repetitive changes in at least one of frequency and volume.

39 Claims, 6 Drawing Sheets

VEHICLE SECURITY SYSTEM WITH MULTI-SOUND PATTERN ALARM AND ASSOCIATED METHODS

FIELD OF THE INVENTION

The present invention relates to the field of vehicle security systems, and, more particularly, to a vehicle security system having a distinctive audible alarm indication.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition. A typical security system also includes a receiver associated with the controller. The receiver cooperates with one or more remote transmitters typically carried by the user and which are used to arm and disarm the vehicle security system, for example. Other remote control features, such as locking or unlocking vehicle doors may also be performed.

The alarm indication provided at the vehicle is important to the overall effectiveness of the security system. For example, a weak alarm indication may do little to deter a would-be thief. A thief may also be more likely to target a vehicle when the vehicle is among hundreds of vehicles in a large parking lot, for example. In such a situation, the thief may be comforted in knowing that the alarm indication will not be identified by the vehicle's owner, since many audible alarm indications are generic.

U.S. Pat. No. 5,079,538 to DeFino et al. discloses an approach to address the shortcomings of generic sounding sirens or alarms. In particular, the patent discloses a processor which can be programmed to provide various multi-toned alarm sounds. Spaced between these multi-toned alarm sounds are a series of repetitive monotones, each of short duration. The number of repetitive monotones is programmed into the processor by the installer of the alarm.

Omega Research & Development, Inc. of Douglasville, Ga. offered a vehicle security system under the model designation AL-800 beginning in 1989 that gave a user the option to select a sequence of six different sound patterns to be used as the audible alarm indication. In other words, six sound patterns were stored in memory and played back in a user selected sequence, one after the other, to thereby create a more unique alarm.

Unfortunately, despite advances in vehicle security system technology, especially as relates to the audible alarm indication, a would-be thief may still ignore the threat of discovery from a conventional audible alarm indication. As more and more cars are equipped with security systems, and as false alarms are a common occurrence, the sound of a conventional vehicle security system alarm maybe unlikely to deter a would-be thief.

SUMMARY OF THE INVENTION

In view of the foregoing background, it is therefore an object of the present invention to provide a vehicle security system and associated method for generating an audible alarm indication at a vehicle that is more likely to deter a would-be thief.

This and other objects, features, and advantages in accordance with the present invention are provided by a vehicle security system comprising an audible alarm indicator at the vehicle, and a controller operating the audible alarm indicator to generate an alarm indication comprising a plurality of distinguishable sound patterns. The sound patterns overlap in time yet are audibly distinguishable from one another to thereby create an illusion of multiple alarms. Accordingly, a would-be thief may be convinced that multiple vehicle alarms have been triggered and, thus, that more than one vehicle owner may be alerted. The multi-sound pattern alarm indication is also quite distinctive thereby overcoming the difficulty of generic sounding alarms.

The vehicle security system may include at least one vehicle security sensor. Accordingly, the controller is preferably responsive to the at least one vehicle security sensor to generate the audible alarm indication.

In one embodiment, the distinguishable sound patterns are different from one another. In another embodiment, at least two of the distinguishable sound patterns are the same sound patterns, but which are out of phase with one another to provide the illusion of multiple alarms.

Each of the distinguishable sound patterns preferably includes successive repetitive portions. For example, each of the distinguishable sound patterns may include repetitive changes in frequency. Alternately, or in addition, each of the distinguishable sound patterns may include repetitive changes in volume.

One feature of the invention is that the distinguishable sound patterns may be started separately in time. In other words, a next distinguishable sound pattern begins a predetermined offset time after starting of a previous distinguishable sound pattern. The predetermined offset time may be user selectable.

Another aspect of the invention is that the vehicle security system preferably comprises a memory connected to or part of the controller. The memory preferably stores a group of distinguishable sound patterns, and the user may select the plurality used for the alarm indication from the group. In addition, the plurality of distinguishable sound patterns may be two in number for a particularly advantageous embodiment. In other words, in this embodiment, the audible alarm indication is a dual distinguishable sound pattern alarm.

A method aspect of the invention is for generating an audible alarm indication for a vehicle security system. The method preferably comprises the steps of: monitoring at least one vehicle security sensor, and generating an audible alarm indication at the vehicle responsive to the at least one vehicle security sensor. Moreover, the audible alarm indication preferably comprises a plurality of distinguishable sound patterns overlapping in time yet audibly distinguishable from one another to create an illusion of multiple alarms.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Figure 1:
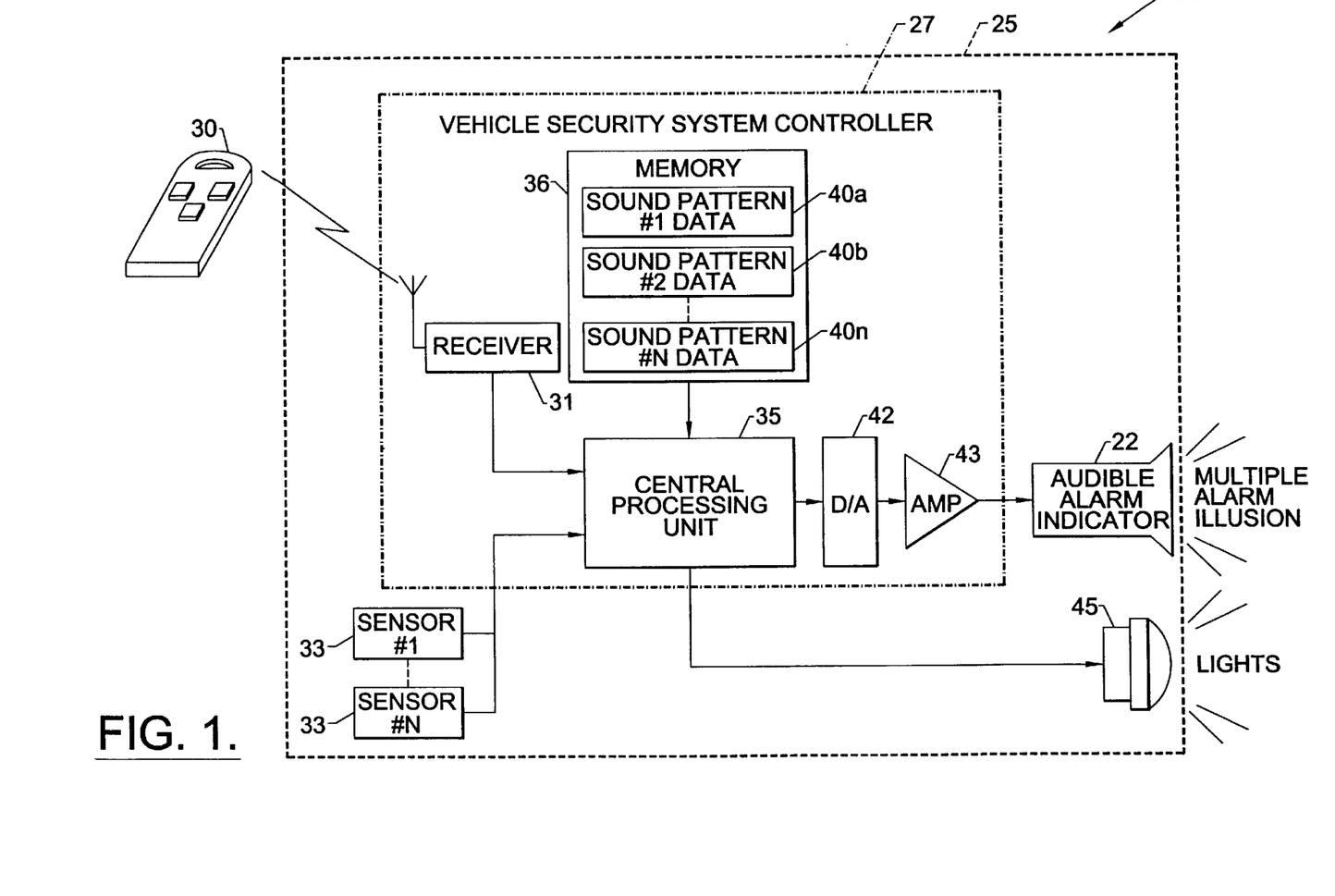
FIG. 1 is a schematic block diagram of the vehicle security system in accordance with the present invention.

Referring initially to FIG. 1, the basic components of the vehicle security system 20 in accordance with the invention are first described. The vehicle security system 20 includes an audible alarm indicator 22 at the vehicle 25. The system also includes a vehicle security system controller 27 which may be in the form of a small electronic module adapted to be mounted within the vehicle 25, such as behind or beneath the dashboard area as will be readily appreciated by those skilled in the art.

The controller 27 operates the audible alarm indicator 22 to generate an alarm indication comprising a plurality of distinguishable sound patterns. These distinguishable sound patterns overlap in time yet are audibly distinguishable from one another to thereby create an illusion of multiple alarms in accordance with a significant feature of the invention. A would-be thief would likely be convinced that multiple vehicle alarms have been triggered and that more than one vehicle owner may be alerted. The multi-sound pattern alarm indication may also be quite distinctive thereby overcoming the difficulty of generic sounding alarms as will be readily appreciated by those skilled in the art. These distinguishable sound patterns and the generation thereof are described in greater detail below.

As shown in the upper left hand portion of FIG. 1, the vehicle security system 20 may include one or more handheld remote transmitters 30 cooperating with a receiver 31 at the vehicle to cause the system to perform certain functions. For example, a common function performed via the remote transmitter 30 may be switching the controller 27 from the armed mode to the disarmed mode and vice versa. As will be readily understood by those skilled in the art, in the armed mode, the controller 27 is typically capable of triggering an alarm indication, such as if a would-be thief opens a vehicle door. Many other remote control functions, such as locking and unlocking doors, and even performing certain system programming functions may be performed using the remote transmitter 30 as will also be appreciated by those skilled in the art.

Of course, the vehicle security system also illustratively includes one or more switches or sensors 33 that connect or interface with the controller 27. For example, these sensors 33 may include door, hood, and/or trunk pin switches; one or more shock sensors; an ignition switch sensor; a valet switch; etc. as will be appreciated by those skilled in the art. The controller 27 is preferably responsive to at least one vehicle security sensor 33 to generate the audible alarm indication.

In the illustrated embodiment, the controller 27 includes a central processing unit (CPU) 35 and the memory 36 connected thereto. The CPU 35 may preferably be a processor operating under stored program control as will be appreciated by those skilled in the art. The memory 36 stores digital representations of distinguishable sound patterns schematically represented by the blocks within the memory indicated by reference numerals 40a–40n. This memory 36 may also store certain data for operating the CPU 35 or the CPU may have a separate or embedded memory for these functions as will be understood by those skilled in the art.

In the illustrated embodiment, the CPU 35 is coupled to a digital-to-analog (D/A) converter 42, which, in turn, is connected to an audio output amplifier 43. Those of skill in the art will appreciate that the D/A conversion may also be implemented in the CPU 35 in other embodiments. The D/A converter 42 converts the digitally stored sound patterns into analog signals for amplification and playback via the illustrated audible alarm indicator 22. Analog recording and playback may also be used; however, the digital approach current offers costs savings and improvements in reliability compared to analog implementations.

The alarm indicator 22 may be a siren, such as a piezoelectric siren; a loudspeaker; or the vehicle horn, for example. In addition, one or more of the associated electronics for driving the audible alarm indicator 22 may be incorporated therewith, such as within a common housing. In any event, these D/A and amplifier electronics, for example, may still be considered part of the controller. In other words, the term "audible alarm indicator" may be considered to cover the electrical to acoustic transducer that converts the electrical energy into the distinguishable sound patterns as will be appreciated by those skilled in the art.

The vehicle security system 20 is also interfaced to the vehicle headlights 45 so that visual indications may also be given. For example, a visual only indication may be desired for indicating receipt of a command from the remote transmitter 30. In addition, the headlights 45 may also be flashed to further indicate an alarm condition at the vehicle 25 as will be appreciated by those skilled in the art.

Figure 2:
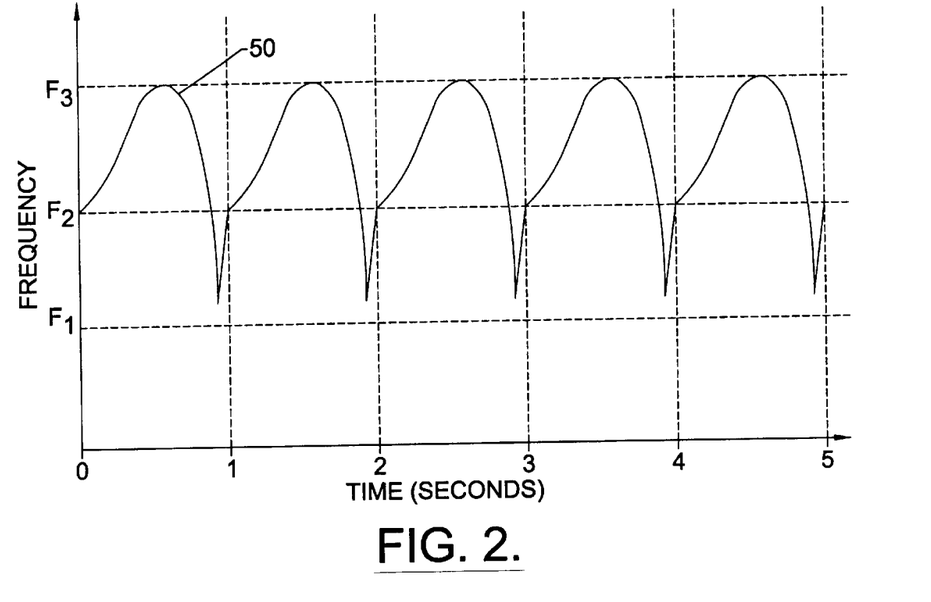
FIG. 2 is a schematic waveform representation of frequency versus time for a first distinguishable sound pattern used in an audible alarm indication for the vehicle security system of FIG. 1.
Figure 3:
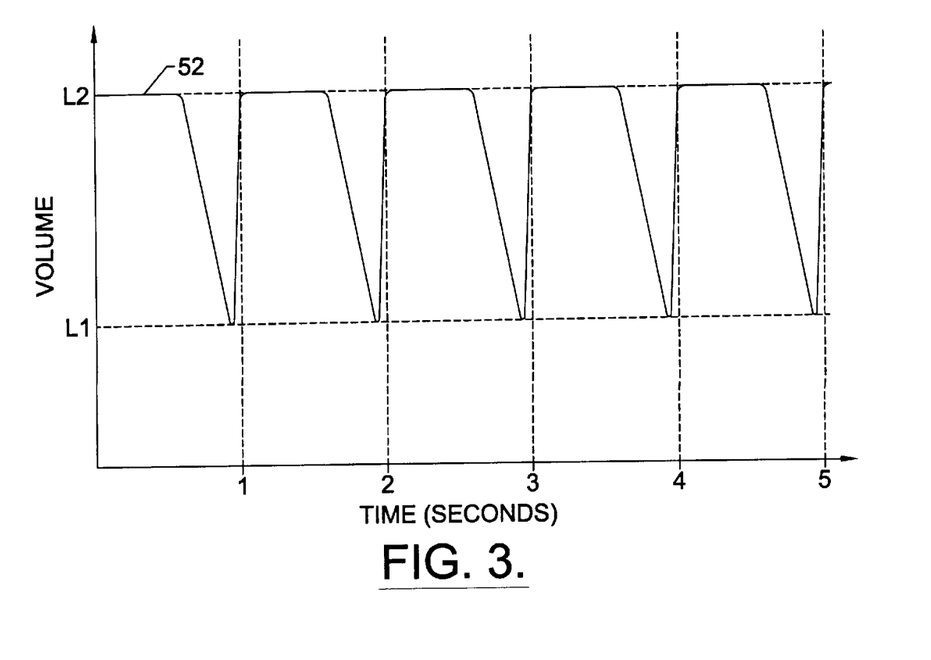
FIG. 3 is a schematic waveform representation of volume versus time for the first distinguishable sound pattern used in an audible alarm indication for the security system of FIG. 1.

Turning now additionally to FIGS. 2 and 3, a first distinguishable sound pattern, as may be used in the vehicle security system 20, is now described. FIG. 2 schematically illustrates a simplified waveform 50 of frequency versus time for the first distinguishable sound pattern. The waveform 50 illustratively includes repetitive portions or changes in frequency that repeat every 1 second. In particular, the frequency ramps upward from an intermediate frequency F2 to a highest frequency F3, quickly decreases to a lowest frequency F1, then returns upward to the starting intermediate frequency F2. As will also be understood by those skilled in the art, the frequencies F1–F3 can be arbitrarily chosen, but are desirably within the audible frequency range of about 20—20 KHz.

As will be readily appreciated by those skilled in the art, the waveform 50 represents a fundamental frequency, for example. In other words, various harmonics of this fundamental may also be present in the sound pattern; however, for clarity of explanation, only the fundamental is illustrated. A distinguishable sound pattern may also include other frequency components; however, only a single fundamental component is illustrated to facilitate understanding. The waveform 50 not only includes portion that repeat every 1 second, but at the end of 5 seconds, for example, the waveform 50 may again be repeated. Accordingly, only 5 seconds worth of data need be stored for this sound pattern in the memory 36.

FIG. 3 is a representative simplified waveform 52 of the volume or intensity of the first distinguishable sound pattern. As can be readily seen, the volume starts relatively high at a highest level L2 and decreases to a lowest level L1. The volume then raises back to the highest level L2. This portion of the volume variation is repeated once every second, and is aligned with the corresponding repetition of the frequency changes or variations as will be readily understood by those skilled in the art. Again, for ease of understanding, the volume of the fundamental frequency only is represented by the waveform 52.

Figure 4:
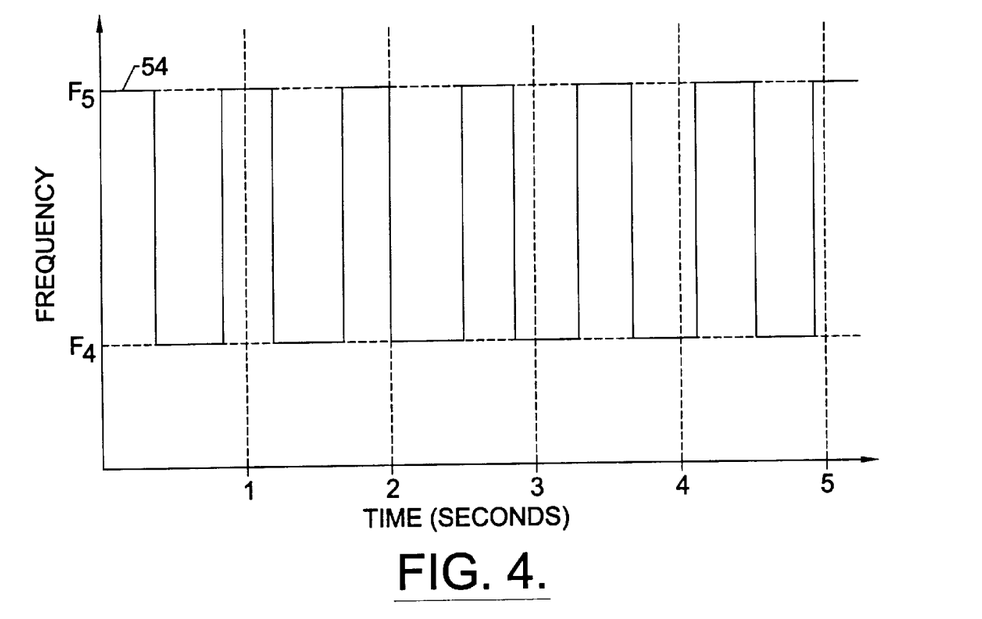
FIG. 4 is a schematic waveform representation of frequency versus time for a second distinguishable sound pattern used in an audible alarm indication for the security system of FIG. 1.
Figure 5:
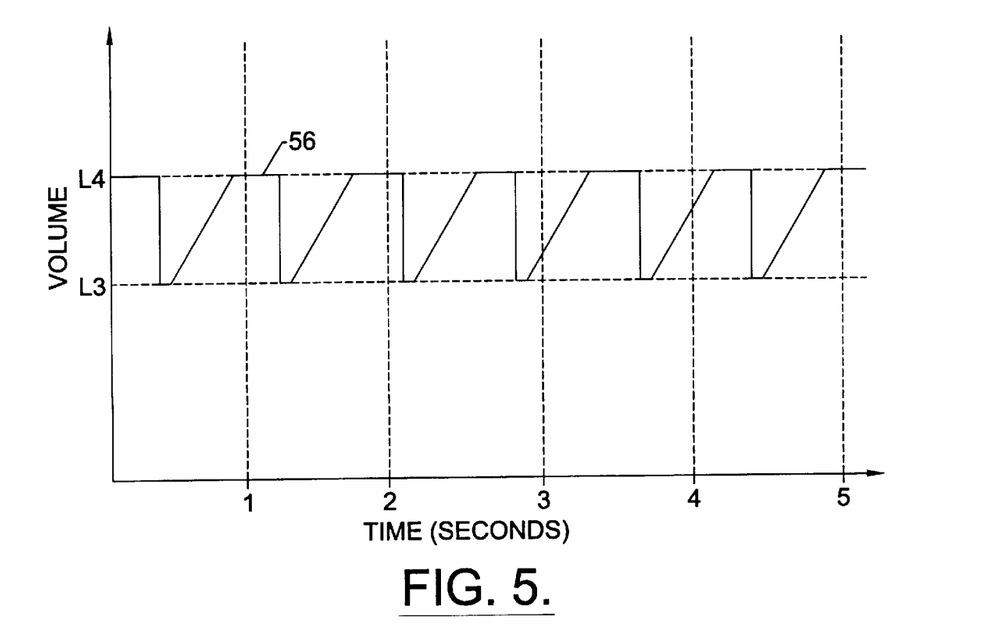
FIG. 5 is a schematic waveform representation of volume versus time for the second distinguishable sound pattern used in an audible alarm indication for the security system of FIG. 1.

Turning now additionally to FIGS. 4 and 5, frequency and volume waveforms 54, 56 for a second distinguishable sound pattern are illustrated. These waveforms 54, 56 include portions that repeat about every 0.85 seconds which is faster than the 1 second repetition rate of the first distinguishable sound pattern. Those of skill in the art will appreciate that many such distinguishable sound patterns are possible. For a typical vehicle security system 20 the number of available distinguishable sound patterns stored in memory 36 may be about six. This is the number of sound patterns stored in the AL-800 security system discussed above, for example. Accordingly, six such sound patterns can be readily stored on a memory or sound chip at a reasonable cost for vehicle security applications as will be appreciated by those skilled in the art.

Figure 6:
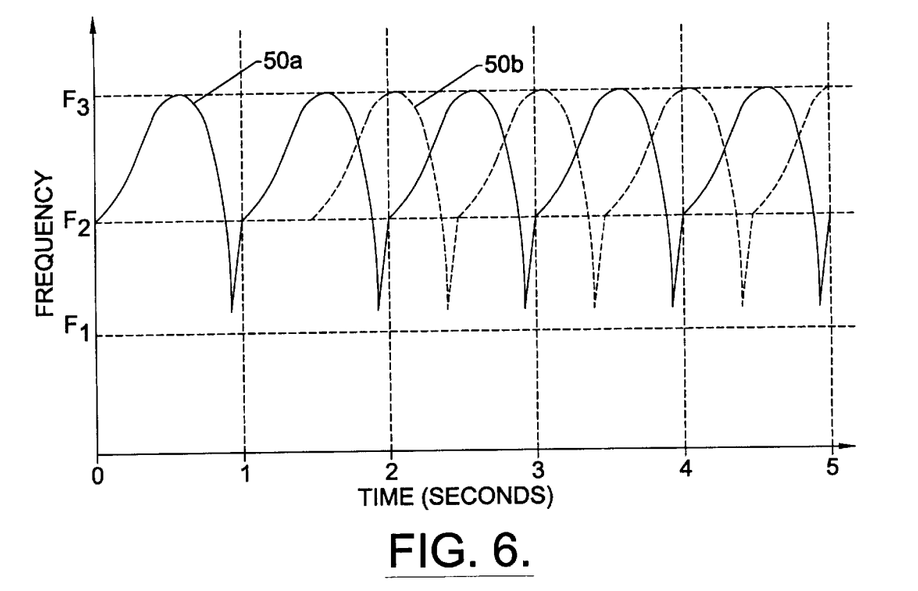
FIG. 6 is a schematic waveform representation of the frequency versus time for an audible alarm indication including two of the first distinguishable sound patterns being played with an initial offset and then simultaneously.
Figure 7:
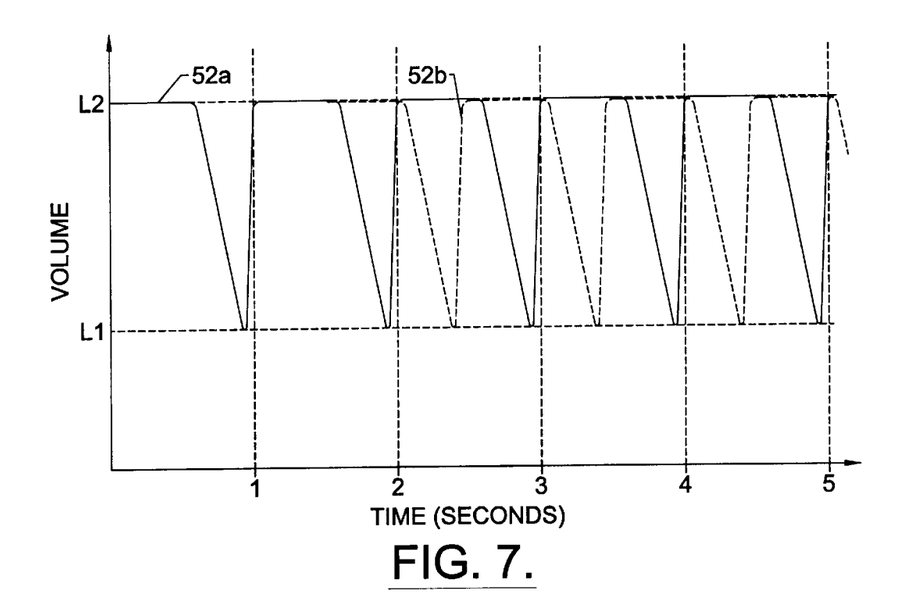
FIG. 7 is a schematic waveform representation of the volume versus time for the audible alarm indication as in FIG. 6 and including two of the first distinguishable sound patterns being played with an initial offset and then simultaneously.

Turning additionally to FIGS. 6 and 7, one embodiment of the invention is now described wherein the plurality of distinguishable sound patterns are produced by generating two of the first distinguishable sound patterns having a delayed start and being thereafter out of phase. As shown by the waveforms 50*a*, 50*b* of FIG. 6, the delayed starting of about 1.5 seconds is evident. Similarly, the volume waveforms 52*a*, 52*b* (FIG. 7) are also offset in starting by about 1.5 seconds. Accordingly, it appears to the would-be thief that a first alarm has sounded then shortly followed by another alarm. In other words, the illusion of multiple alarms is further enhanced in accordance with this feature of the present invention.

The delayed starting may be set by the user in accordance with another advantage of the invention. For example, the delayed starting may be up to about 5 seconds. Additionally, in other embodiments, the two distinguishable sound patterns may start at the same time, but be out of phase with respect to one another to thereby retain their distinguishing characteristics.

Figure 8:
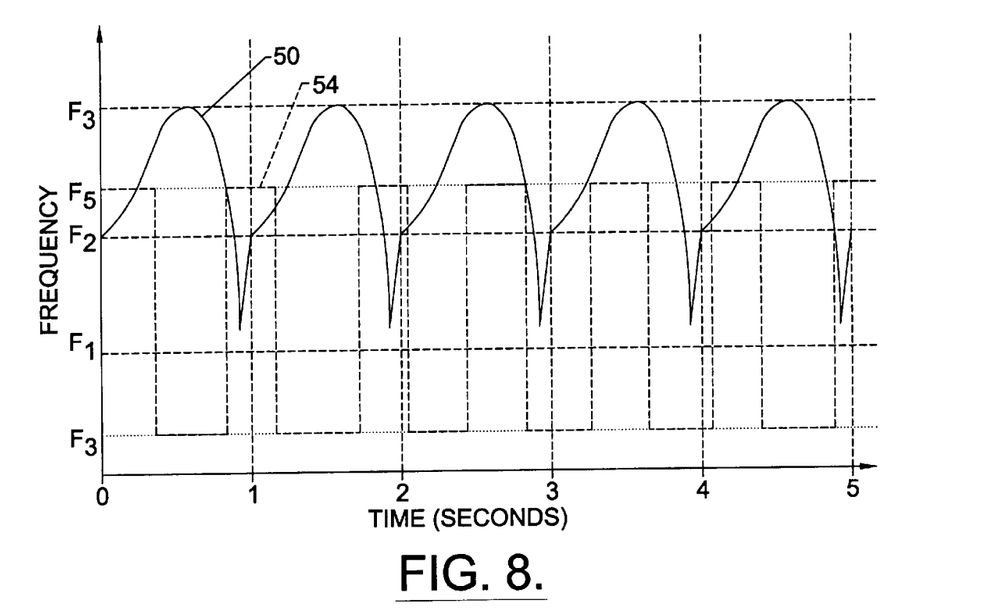
FIG. 8 is a schematic waveform representation of the frequency versus time for an audible alarm indication including the first and second distinguishable sound patterns being played simultaneously.
Figure 9:
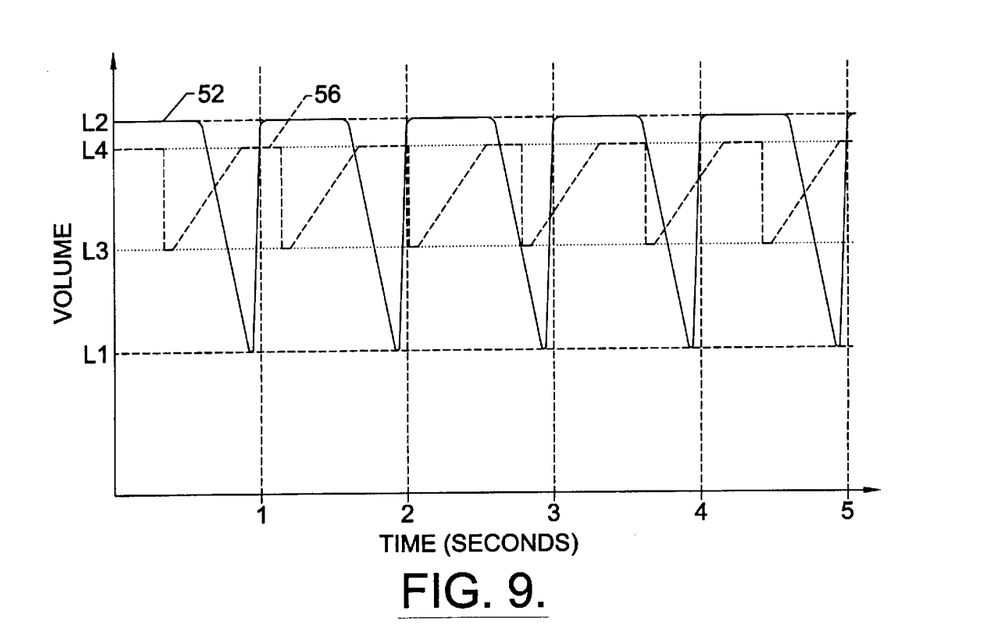
FIG. 9 is a schematic waveform representation of the volume versus time for the audible alarm indication as in FIG. 8 and including the first and second distinguishable sound patterns being played simultaneously.

Turning now to FIGS. 8 and 9 another embodiment of the invention is now explained. In accordance with this embodiment, the two distinguishing sound patterns are two different sound patterns, and which are started simultaneously and overlap after starting. the frequency waveforms 50, 54 are shown in FIG. 8, while the volume waveforms 52, 56 are shown in FIG. 9. Here again, two distinguishable sound patterns are produced which cause the illusion that multiple alarms have been triggered. Accordingly, the would-be thief is likely to be quickly discouraged and abandoned his efforts. In contrast, with prior art single alarm sound patterns, especially generic sound patterns, a would-be thief could proceed to steal valuables from the vehicle knowing that the alarm would likely be ignored.

Summarizing briefly, the distinguishable sound patterns may be different from one another in some embodiments. In other embodiments, at least two of the distinguishable sound patterns may be the same sound pattern, but which are out of phase with one another to provide the illusion of multiple alarms. Each of the distinguishable sound patterns preferably includes successive repetitive portions. For example, each of the distinguishable sound patterns may include repetitive changes in frequency. Alternately, or in addition, each of the distinguishable sound patterns may include repetitive changes in volume. In addition, another feature of the invention is that the distinguishable sound patterns may be started separately in time. In other words, a next distinguishable sound pattern may be caused to begin a predetermined offset time after starting of a previous distinguishable sound pattern, and the predetermined offset time may be user selectable.

Figure 10:
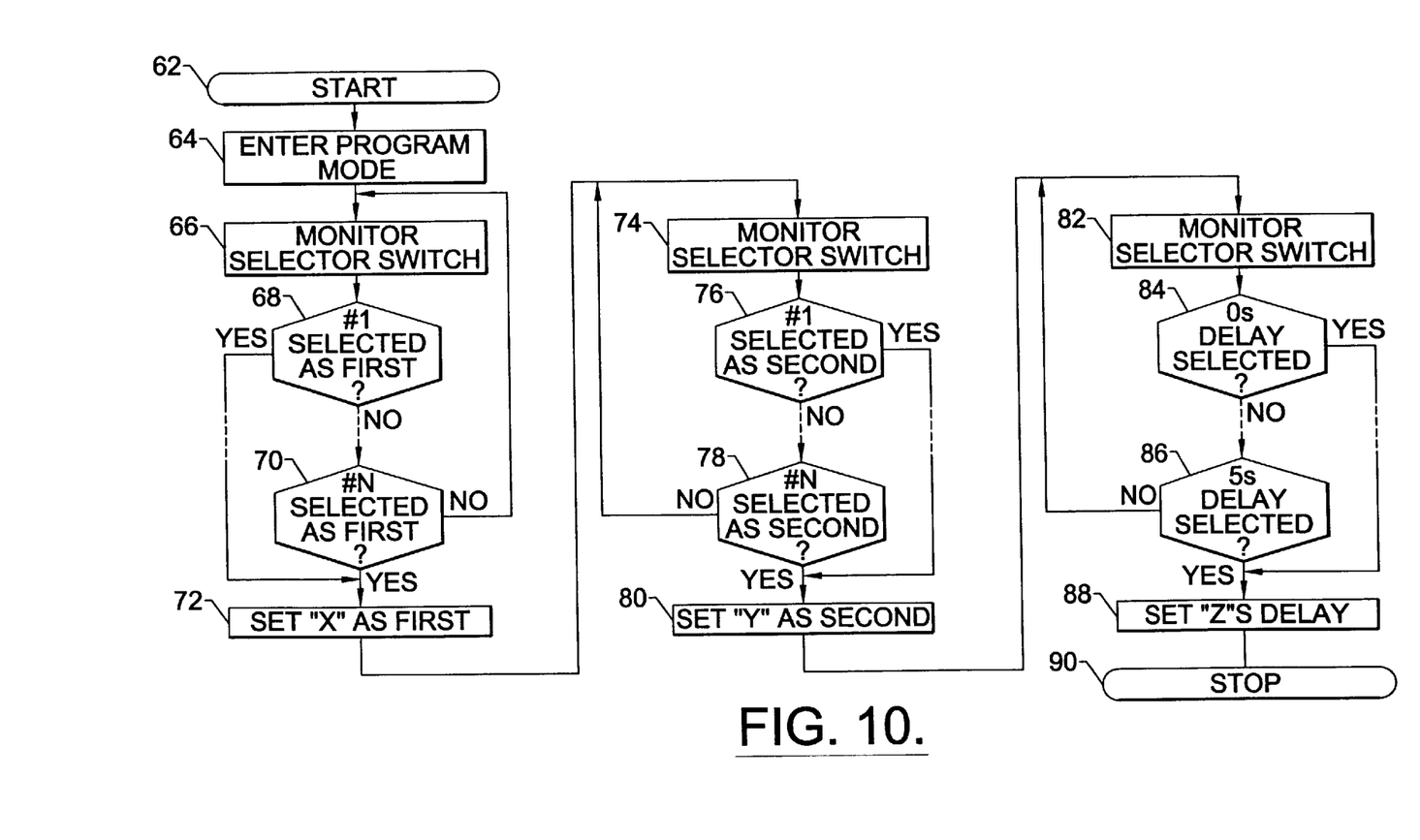
FIG. 10 is a flow chart illustrating the method of selecting the various audible alarm indication parameters in accordance with the present invention.

Referring now to the flow chart of FIG. 10, the selectability of various parameters is now described. From the start (Block 62), a programming mode may be entered for the vehicle security system 20. For example, a combination of ignition switch position and depressing of the valet switch, for example, may set the system 20 into a program mode. Thereafter, the remote transmitter 30 and valet switch may be used to set a number of parameters that effect the operation of the security system 20 as will be appreciated by those skilled in the art.

In particular, the conventional programming mode and parameters set therein may be modified to allow setting of various parameters relating to the distinguishable sound patterns in accordance with the present invention. At Block 66, a selector switch may be monitored, which may, for example, be operation of a button on the remote transmitter 30. Of course, other switches and switching arrangements are also possible and are contemplated by the present invention.

At Blocks 68–70 it is determined which from among a group (N) of stored and available data for respective distinguishable sound patterns is selected as the first sound pattern. At Block 72, the selected "X" sound pattern is set as the first distinguishable sound pattern.

At Block 74 the monitoring continues, and at Blocks 76–78 it is determined which of the available distinguishable sound patterns is selected as the second sound pattern. At Block 80, the selected distinguishable sound pattern "Y" is set as the second sound pattern.

Only selection of two distinguishable sound patterns is disclosed herein for simplicity of explanation. Those of skill in the art will recognize that three or more such distinguishable sound patterns could be selected. However, it has also been found that two such distinguishable sound patterns may be preferred in practice, since it may be difficult to distinguish too many sound patterns at the same time. Accordingly, it is envisioned that only two distinguishable sound patterns may be preferred by a large number of users.

At Block 82, the selector switch is monitored, and at Blocks 84–86 it is determined what delay between starting, if any, is desired. For example, the delay may be selected between 0 and 5 seconds as shown in the illustrated embodiment. Other delay or starting offset times are also contemplated by the invention.

In yet other embodiments of the invention, the distinguishable sound patterns may be selected to change sequentially. For example, one of the distinguishable sound patterns could be selected to play continuously, while the others stored in the memory play sequentially. In addition, the respective volumes of the distinguishable sound patterns could be selected so that one is lower, and thus, appears to be further away. Accordingly, many modifications and other embodiments of the invention will come to the mind of one skilled in the art having the benefit of the teachings presented in the foregoing descriptions and the associated drawings. Accordingly, it is understood that the invention is not to be limited to the illustrated embodiments disclosed, and that the modifications and embodiments are intended to be included within the spirit and scope of the appended claims.

That which is claimed is:

1. A vehicle security system comprising:
   at least one vehicle security sensor;
   an audible alarm indicator at the vehicle; and
   a controller for operating said audible alarm indicator, responsive to said at least one vehicle security sensor, to generate an audible alarm indication comprising a plurality of distinguishable sound patterns overlapping in time yet audibly distinguishable from one another to create an illusion of multiple alarms, the plurality of distinguishable sound patterns having respective fundamental frequency components varying in frequency versus time from one another.

2. A vehicle security system according to claim 1 wherein the plurality of distinguishable sound patterns are different from one another.

3. A vehicle security system according to claim 1 wherein the plurality of distinguishable sound patterns are same sound patterns out of phase with one another.

4. A vehicle security system according to claim 1 wherein each of the plurality of distinguishable sound patterns includes successive repetitive portions.

5. A vehicle security system according to claim 1 wherein each of the plurality of distinguishable sound patterns includes repetitive changes in frequency.

6. A vehicle security system according to claim 1 wherein each of the plurality of distinguishable sound patterns includes repetitive changes in volume.

7. A vehicle security system according to claim 1 wherein said controller causes starting of the plurality of distinguishable sound patterns separated in time.

8. A vehicle security system according to claim 7 wherein a next distinguishable sound pattern begins a predetermined offset time after starting of a previous distinguishable sound pattern.

9. A vehicle security system according to claim 8 wherein the predetermined offset time is selectable by a user.

10. A vehicle security system according to claim 1 wherein said controller comprises a memory storing therein digital representations of at least the plurality of distinguishable sound patterns overlapping in time.

11. A vehicle security system according to claim 10 wherein said memory stores therein digital representations of a set of distinguishable sound patterns greater in number than the plurality of distinguishable sound patterns overlapping in time; and wherein said controller permits user selection of the plurality of distinguishable sound patterns overlapping in time from the group of distinguishable sound patterns stored in said memory.

12. A vehicle security system according to claim 1 wherein the plurality of distinguishable sound patterns are two in number.

13. A vehicle security system comprising:
    an audible alarm indicator at the vehicle; and
    a controller comprising a memory for storing digital representations of a plurality of distinguishable sound patterns therein and cooperating with said audible alarm indicator for generating an audible alarm indication comprising the plurality of distinguishable sound patterns overlapping in time, the plurality of distinguishable sound patterns having respective fundamental frequency components varying in frequency versus time from one another.

14. A vehicle security system according to claim 13 wherein said memory stores therein digital representations of a set of distinguishable sound patterns greater in number than the plurality of distinguishable sound patterns and including the plurality of distinguishable sound patterns overlapping in time; and wherein said controller permits user selection of the plurality of distinguishable sound patterns overlapping in time from the group of distinguishable sound patterns stored in said memory.

15. A vehicle security system according to claim 14 wherein the plurality of distinguishable sound patterns are two in number.

16. A vehicle security system according to claim 13 wherein the plurality of distinguishable sound patterns are different from one another.

17. A vehicle security system according to claim 13 wherein the plurality of distinguishable sound patterns are same sound patterns out of phase with one another.

18. A vehicle security system according to claim 13 wherein each of the plurality of distinguishable sound patterns includes successive repetitive portions.

19. A vehicle security system according to claim 13 wherein each of the plurality of distinguishable sound patterns includes repetitive changes in at least one of frequency and volume.

20. A vehicle security system comprising:
    an audible alarm indicator at the vehicle; and
    a controller for operating said audible alarm indicator to generate an audible alarm indication comprising a plurality of distinguishable sound patterns starting separately in time and overlapping thereafter, the plurality of distinguishable sound patterns having respective fundamental frequency components varying in frequency versus time from one another.

21. A vehicle security system according to claim 20 wherein a next distinguishable sound pattern begins a predetermined offset time after starting of a previous distinguishable sound pattern.

22. A vehicle security system according to claim 21 wherein the predetermined offset time is selectable by a user.

23. A vehicle security system according to claim 20 wherein the plurality of distinguishable sound patterns are different from one another.

24. A vehicle security system according to claim 20 wherein the plurality of distinguishable sound patterns are same sound patterns out of phase with one another.

25. A vehicle security system according to claim 20 wherein each of the plurality of distinguishable sound patterns includes successive repetitive portions.

26. A vehicle security system according to claim 20 wherein each of the plurality of distinguishable sound patterns includes repetitive changes in at least one of frequency and volume.

27. A vehicle security system according to claim 20 wherein said controller comprises a memory storing therein digital representations of at least the plurality of distinguishable sound patterns overlapping in time.

28. A vehicle security system according to claim 20 wherein the plurality of distinguishable sound patterns are two in number.

29. A method for generating an audible alarm indication for a vehicle security system comprising the steps of:

monitoring at least one vehicle security sensor; and generating an audible alarm indication at the vehicle responsive to the at least one vehicle security sensor, the audible alarm indication comprising a plurality of distinguishable sound patterns overlapping in time yet audibly distinguishable from one another to create an illusion of multiple alarms, the plurality of distinguishable sound patterns having respective fundamental frequency components varying in frequency versus time from one another.

30. A method according to claim 29 wherein the plurality of distinguishable sound patterns are different from one another.

31. A method according to claim 29 wherein the plurality of distinguishable sound patterns are same sound patterns out of phase with one another.

32. A method according to claim 29 wherein each of the plurality of distinguishable sound patterns includes successive repetitive portions.

33. A method according to claim 29 wherein each of the plurality of distinguishable sound patterns includes repetitive changes in at least one of frequency and volume.

34. A method according to claim 29 wherein the step of generating comprises starting the plurality of distinguishable sound patterns separated in time.

35. A method according to claim 34 wherein a next distinguishable sound pattern begins a predetermined offset time after starting of a previous distinguishable sound pattern.

36. A method according to claim 35 further comprising the step of selecting the predetermined offset time.

37. A method according to claim 29 further comprising the step of storing digital representations of the plurality of distinguishable sound patterns in a memory; and wherein the step of generating the audible alarm indication comprises playing back the distinguishable sound patterns overlapping in time from the memory.

38. A method according to claim 37 wherein the step of storing comprises storing in the memory digital representations of a set of distinguishable sound patterns greater in number than the plurality of distinguishable sound patterns overlapping in time; and further comprising the step of selecting the plurality of distinguishable sound patterns overlapping in time from the group of distinguishable sound patterns stored in the memory.

39. A method according to claim 29 wherein the plurality of distinguishable sound patterns are two in number.

* * * * *